(12) United States Patent
Jordan

(10) Patent No.: US 10,343,106 B2
(45) Date of Patent: Jul. 9, 2019

(54) VAPOR RECOVERY SYSTEM

(71) Applicant: Jordan Technologies, LLC, Louisville, KY (US)

(72) Inventor: Mark A. Jordan, Louisville, KY (US)

(73) Assignee: JORDAN TECHNOLOGIES, LLC, Louisville, KY (US)

( * ) Notice: Subject to any disclaimer, the term of this patent is extended or adjusted under 35 U.S.C. 154(b) by 109 days.

(21) Appl. No.: 15/517,582

(22) PCT Filed: Oct. 6, 2015

(86) PCT No.: PCT/US2015/054238
§ 371 (c)(1),
(2) Date: Apr. 7, 2017

(87) PCT Pub. No.: WO2016/057511
PCT Pub. Date: Apr. 14, 2016

(65) Prior Publication Data
US 2017/0252692 A1    Sep. 7, 2017

Related U.S. Application Data

(60) Provisional application No. 62/060,679, filed on Oct. 7, 2014.

(51) Int. Cl.
*B01D 53/053* (2006.01)
*B67D 7/04* (2010.01)
(Continued)

(52) U.S. Cl.
CPC ......... *B01D 53/053* (2013.01); *B67D 7/0486* (2013.01); *F22B 37/50* (2013.01);
(Continued)

(58) Field of Classification Search
CPC .. B01D 53/04; B01D 53/047; B01D 53/0476; B01D 53/053; B01D 2257/708;
(Continued)

(56) References Cited

U.S. PATENT DOCUMENTS 3,867,111 A * 2/1975 Knowles ............... B01D 53/04
95/146
3,979,175 A * 9/1976 Kattan ............... B01D 53/0454
431/5

(Continued)

FOREIGN PATENT DOCUMENTS

WO        2010126476 A1    11/2010

*Primary Examiner* — Frank M Lawrence, Jr.
(74) *Attorney, Agent, or Firm* — King & Schickli, PLLC

(57) ABSTRACT

A volatile liquid vapor recovery system is used to recover vapors produced in the loading of shipping vehicles with volatile liquid product from a storage tank. The recovery system uses a primary vessel with an adsorption bed for adsorbing the volatile liquid vapors and venting clean air including oxygen to the atmosphere. The recovery system regenerates the adsorption bed by recovering the volatile liquid vapors from the adsorption bed and directly delivering said vapors to the storage tank. The system may be adapted to remove oxygen from the primary vessel prior to regeneration, such as by purging and venting the primary vessel with a purge gas or by providing a secondary vessel to receive oxygen and vapors from the primary vessel prior to regeneration of the first adsorption bed. Adsorbed volatile liquid vapor from the secondary vessel can be recycled to the primary vessel for conservation.

18 Claims, 11 Drawing Sheets

(51) Int. Cl.
*F22B 37/50* (2006.01)
*B01D 53/047* (2006.01)
*F22B 37/48* (2006.01)

(52) U.S. Cl.
CPC ........ *B01D 53/047* (2013.01); *B01D 53/0476* (2013.01); *B01D 2257/708* (2013.01); *B01D 2259/402* (2013.01); *B01D 2259/40056* (2013.01); *B01D 2259/4516* (2013.01); *B01D 2259/4525* (2013.01); *B67D 7/048* (2013.01); *F22B 37/48* (2013.01)

(58) Field of Classification Search
CPC .... B01D 2259/40056; B01D 2259/402; B01D 2259/4516; B01D 2259/4525; B67D 7/048; B67D 7/0486; F22B 37/48; F22B 37/50
USPC .......... 95/90, 95, 97, 143, 146, 148; 96/121, 96/131, 143, 144
See application file for complete search history.

(56) References Cited

U.S. PATENT DOCUMENTS

| | | | |
|---|---|---|---|
| 4,056,369 A | | 11/1977 | Quackenbush |
| 4,343,629 A | * | 8/1982 | Dinsmore .............. B01D 53/04 95/104 |
| 5,015,365 A | * | 5/1991 | Vara ....................... B01D 53/04 208/262.1 |
| 5,681,369 A | | 10/1997 | Osborne |
| 5,853,455 A | | 12/1998 | Gibson |
| 5,871,568 A | * | 2/1999 | Gibson .............. B01D 53/0407 96/122 |
| 6,428,697 B1 | * | 8/2002 | Edgar ...................... C02F 9/00 204/660 |
| 2014/0326137 A1 | * | 11/2014 | Jordan ............... B01D 53/0476 95/95 |
| 2015/0135950 A1 | * | 5/2015 | Gomez ................. B01D 53/04 95/92 |

\* cited by examiner

VAPOR RECOVERY SYSTEM

This application claims priority to U.S. Provisional Patent Application Ser. No. 62/060,679, filed Oct. 7, 2014, the disclosure of which is incorporated herein by reference.

TECHNICAL FIELD

The present invention relates generally to an apparatus and process for recovering volatile liquids from air-volatile liquid vapor mixtures expelled from vessels such as transportation vehicles during loading, and, more particularly, to an improved apparatus and process that efficiently removes oxygen from the recovered volatile liquid vapor and returns said recovered volatile liquid vapor to a storage tank used to load said vessels.

BACKGROUND OF THE INVENTION

In the process of loading volatile liquid products into a vessel, such as for transport, volatile liquid vapor is produced. Venting such vapor into the atmosphere is problematic both from an environmental perspective, and because valuable product is lost in the process. For example, a typical loading facility's air permit may be limited to 50 tons per year of volatile organic compounds (VOCs). By loading a single 200 barrel truck each day and venting the gases into the atmosphere, 14.8 tons of the 50 ton annual limit will be exhausted. Accordingly, volatile liquid vapor recovery systems have been used to remove and recover the volatile liquid vapor.

Another consideration in the loading and recovery process is that an empty tanker truck or railcar includes a relatively large volume of air. About 21% of that air is oxygen. When a tanker truck is filled with a volatile liquid product, that air is displaced into the volatile liquid vapor recovery system normally utilized to collect the volatile liquid vapor produced during the filling or loading process. That system traps volatile liquid vapors which are absorbed by a bed of adsorbent and vents much of the "clean" air to the atmosphere.

However, in a conventional recovery system, air, including oxygen, is maintained in the overhead space of the reaction vessel containing the bed of adsorbent and in the lines leading to the vent. This can be problematic, as loading facilities generally have limits regarding the amount of oxygen that may be present. For example, a natural gas facility is typically limited to 10 ppm per $ft^3$ of oxygen in the natural gas sales pipe line. When vapor balancing a 200 barrel load to a storage tank in order to reduce emissions, the process will inject on average 16 $ft^3$ per minute of a 124,000 ppm $O_2$ gas for a one hour period. Conventional vapor recovery systems are not equipped to both remove the oxygen from the recovery system and to return oxygen free (or significantly oxygen reduced) recovered volatile liquid vapor to a storage tank.

Accordingly, the present invention addresses the need to efficiently remove oxygen from a volatile liquid vapor recovery system.

SUMMARY OF THE INVENTION

This document describes a system that virtually eliminates ingestion of air, including the oxygen contained therein, into a storage tank from a volatile liquid vapor recovery system when the volatile liquid vapors trapped in a bed of adsorbent are released from the bed of adsorbent and returned to the storage tank.

In a first embodiment, a vapor recovery system for recovering volatile liquid vapor produced when loading a vessel from a storage tank is disclosed. The vessel may comprise a transportation vessel, such as a truck, a train car, or any other shipping vessel. The storage tank may include an underground storage tank such as one used to store a volatile liquid product before being loaded for transport.

The system may comprise a product handling circuit including a primary reaction vessel holding a first bed of adsorbent adapted to adsorb the volatile liquid vapor and a primary conduit for transporting volatile liquid vapor from the vessel to the primary reaction vessel, and a bed regeneration circuit including a secondary reaction vessel holding a second bed of adsorbent, said secondary reaction vessel adapted to receive vapor from the primary reaction vessel, a vapor pump wherein an upstream end of said vapor pump is connected by a first conduit to said primary reaction vessel and by a second conduit to said secondary reaction vessel and wherein a downstream end of said vapor pump is connected by a third conduit to said secondary reaction vessel and is further connected to a fourth conduit adapted to directly connect the primary reaction vessel to the storage tank, via the vapor pump. In the context of this disclosure, the term "directly connect" or "directly connected" shall mean that two elements are connected to one another without any further separation, adsorption, or absorption element between the two elements.

In one aspect, the system may include a first flow control valve in said first conduit for isolating said product handling circuit from said regeneration circuit when loading the vessel with volatile liquid product and collecting volatile liquid vapor on said first bed of adsorbent in said primary reaction vessel. The system may further include a second flow control valve in the second conduit for controlling flow of volatile liquid vapor from said secondary reaction vessel to said vapor pump. A third flow control valve may be provided in said third conduit for controlling flow of volatile liquid vapor from said vapor pump to said secondary reaction vessel. A fourth flow control valve may be provided in said fourth conduit for controlling flow of volatile liquid vapor from said vapor pump to said storage tank.

The product handling circuit may further include an atmospheric relief valve between said vessel and said primary reaction vessel.

In a further aspect, the system may include a source of nitrogen connected to said primary reaction vessel.

In another aspect, the system may include a diffusion nozzle connected to said fourth conduit for delivering volatile liquid vapors into volatile liquid product held in said storage tank.

The system may further include a recycle conduit connecting said regeneration circuit to said product handling circuit between said inlet and said primary reaction vessel, and a fifth flow control valve in said recycle conduit for controlling flow from the regeneration circuit to the product handling circuit.

The product handling circuit may include a first pump and a bypass line around said first pump.

In one aspect, the primary reaction vessel may comprise multiple reaction vessels connected in series.

In another embodiment, a method is disclosed for recovering volatile liquid vapors produced when loading a tank. The method may include the steps of collecting volatile liquid vapors on a first bed of adsorbent in a primary reaction vessel while loading a volatile liquid product into the tank, displacing volatile liquid vapors and oxygen from said primary reaction vessel and collecting said volatile liquid vapors on a second bed of adsorbent in a secondary reaction vessel while venting said oxygen to atmosphere, regenerating said first bed of adsorbent by removing volatile liquid vapors from said first bed of adsorbent and directing said volatile liquid vapors to a storage tank directly connected to said primary reaction vessel, said storage tank holding volatile liquid product, and regenerating said second bed of adsorbent by removing volatile liquid vapors from said second bed of adsorbent and collecting said volatile liquid vapors on said first bed of adsorbent in said primary reaction vessel.

The method may further include the step of purging said first bed of adsorbent in said primary reaction vessel with an inert gas during regeneration of said first bed. In one aspect, the method may include moving said oxygen from said first reaction vessel through said second reaction vessel before venting said oxygen to atmosphere.

In a further embodiment, a vapor recovery system is disclosed for recovering volatile liquid vapor from a composition including volatile liquid vapor and oxygen produced when loading a loading vessel from a storage tank of volatile liquid product. The system may include a product handling circuit including a primary reaction vessel holding a first bed of adsorbent adapted to adsorb the volatile liquid vapor, a primary conduit for transporting the composition from the loading vessel to the primary reaction vessel, and a primary exhaust for venting oxygen to atmosphere, an oxygen removal circuit, including a secondary reaction vessel holding a second bed of adsorbent, a vapor pump, a first conduit connecting the primary reaction vessel to an upstream end of the vapor pump, a second conduit connecting a downstream end of the vapor pump to the secondary reaction vessel, and a secondary exhaust for venting oxygen to atmosphere, a product recovery circuit, including a third conduit connecting the downstream end of the vapor pump to the storage tank, wherein the product recovery circuit connects the primary reaction vessel to the storage tank with no separation, adsorption, or absorption vessel therebetween, and a recycle circuit, including a fourth conduit connecting the secondary reaction vessel to the upstream end of the vapor pump, and a recycle conduit connecting the downstream end of the vapor pump to the primary reaction vessel. In one aspect, the circuits may include at least some overlap, including the vapor pump comprising at least a part of the oxygen removal circuit as well as the product recovery circuit and the recycle circuit.

The system may further include a primary valve in the primary conduit, a first valve in the first conduit, a second valve in the second conduit, a third valve in the third conduit, a fourth valve in the fourth conduit, and a recycle valve in the recycle conduit. The product handling circuit may be adapted to transport the composition from the loading vessel to the primary reaction vessel and vent oxygen to atmosphere when the primary valve and primary exhaust are opened and when the first valve and the recycle valve are closed. The oxygen removal circuit may be adapted to transport the composition from the primary reaction vessel to the secondary reaction vessel via the vapor pump and vent oxygen to atmosphere when the first valve, the second valve, and the secondary exhaust are open and when the primary exhaust, the primary valve, the third valve, the fourth valve, and the recycle valve are closed. The product recovery circuit may be adapted to regenerate the first bed of adsorbent by transporting adsorbed volatile liquid vapor from the primary reaction vessel directly to the storage tank via the vapor pump when the first valve and third valve are open and when the primary exhaust, the second valve, and the recycle valve are closed. The recycle circuit may be adapted to regenerate the second bed of adsorbent by recycling the adsorbed volatile liquid vapor from the secondary reaction vessel directly to the primary reaction vessel via the vapor pump and vent oxygen to the atmosphere when the fourth valve, the recycle valve, and the primary valve are open and the first valve, the second valve, and the third valve are closed.

In another embodiment of the present invention, a vapor recovery system is disclosed for recovering volatile liquid vapor from a combination of volatile liquid vapor and oxygen collected when loading a loading vessel with volatile liquid product from a storage tank. The system may comprise a product handling circuit including a primary reaction vessel having an inlet side and an outlet side, said primary reaction vessel holding a first bed of adsorbent adapted to adsorb the volatile liquid vapor, a primary conduit connected to the inlet side for transporting volatile liquid vapor and oxygen from the loading vessel to the primary reaction vessel, and an exhaust connected to the outlet side for venting oxygen to atmosphere, and a bed regeneration circuit adapted to remove volatile liquid vapor from the first bed of adsorbent, said bed regeneration circuit including a vapor pump wherein an upstream end of said vapor pump is directly connected by a first conduit to the inlet side of said primary reaction vessel and wherein a downstream end of said vapor pump is directly connected by a second conduit to said storage tank.

The system may further include a primary flow control valve in said primary conduit and a first flow control valve in the first conduit, said primary and first flow control valves adapted to isolate said product handling circuit from said regeneration circuit. The primary valve in an open condition and the first valve in a closed condition may allow volatile liquid vapor to flow from the loading vessel to the primary reaction vessel for collection on said first bed of adsorbent. The primary valve in a closed condition and the first valve in an open condition may allow volatile liquid vapor to flow directly from the primary reaction vessel to the storage tank.

In one aspect, the bed regeneration circuit may include a first purge gas source connected to the outlet side of the primary reaction vessel, and the bed regeneration circuit may be adapted to transport a first purge gas from said first purge gas source through the primary reaction vessel, through the first conduit and the second conduit, and into the storage tank. The bed regeneration circuit may further include a second purge gas source connected to the inlet side of the primary reaction vessel, and the bed regeneration circuit may be adapted to transport a second purge gas from the second purge gas source through the primary reaction vessel and out the exhaust to atmosphere.

In another aspect, the bed regeneration circuit may include a secondary reaction vessel holding a second bed of adsorbent, said secondary reaction vessel adapted to receive vapor and oxygen from the primary reaction vessel, a third conduit connecting a downstream end of the vapor pump to the secondary reaction vessel, and a fourth conduit connecting the secondary reaction vessel to an upstream end of the vapor pump. The third conduit may include a third valve for controlling flow from the vapor pump to the secondary reaction vessel, and wherein the fourth conduit includes a fourth valve for controlling flow from the secondary reaction vessel to the vapor pump. The system may include a recycle conduit connecting said regeneration circuit to said product handling circuit between the downstream end of the vapor pump and the primary conduit, and may further include a fifth flow control valve in said recycle conduit for controlling flow from the bed regeneration circuit to the product handling circuit. The third and fourth conduits may connect to an inlet side of the secondary reaction vessel. In this aspect, the bed regeneration circuit may include a secondary exhaust connected to an outlet side of the secondary reaction vessel.

The system may include a diffusion nozzle connected to said second conduit for delivering volatile liquid vapors from the primary reaction vessel into the volatile liquid product held in said storage tank.

The primary reaction vessel may comprise multiple reaction vessels connected in series.

In a further embodiment of the present invention, a method is disclosed for recovering volatile liquid vapors and removing oxygen resulting from loading volatile liquid product into a loading vessel from a storage tank. The method may comprise collecting the volatile liquid vapors on a first bed of adsorbent in a primary reaction vessel and exhausting oxygen from said primary reaction vessel, and regenerating said first bed of adsorbent by removing volatile liquid vapors from said first bed of adsorbent and directly delivering said volatile liquid vapors to the storage tank.

In one aspect, the method may include displacing volatile liquid vapors and oxygen from said primary reaction vessel and collecting said volatile liquid vapors on a second bed of adsorbent in a secondary reaction vessel while venting said oxygen to atmosphere. In this aspect, the method may further include regenerating said second bed of adsorbent by removing volatile liquid vapors from said second bed of adsorbent and collecting said volatile liquid vapors on said first bed of adsorbent in said primary reaction vessel.

In another aspect, the method may include the step of displacing oxygen from the primary reaction vessel with a purge gas and venting said oxygen to atmosphere.

In still another embodiment, the invention relates to a vapor recovery system for recovering volatile liquid vapor from a composition including volatile liquid vapor and oxygen produced when loading a loading vessel from a storage tank of volatile liquid product. The system comprises a product handling circuit including a primary reaction vessel holding a first bed of adsorbent adapted to adsorb the volatile liquid vapor, a primary conduit for transporting the composition from the loading vessel to the primary reaction vessel, and a primary exhaust for venting oxygen to atmosphere. The system further includes means for removing oxygen from the primary reaction vessel. In addition, the system comprises a product recovery circuit including a vapor pump with an upstream end and a downstream end, a first conduit connecting the primary reaction vessel to the upstream end of the vapor pump, a second conduit directly connecting the downstream end of the vapor pump to the storage tank, and a first purge gas source, wherein the product recovery circuit is adapted to deliver a first purge gas from the first purge gas source through the primary reaction vessel, the first conduit, and the second conduit to the storage tank, wherein the product recovery circuit connects the primary reaction vessel to the storage tank with no separation, adsorption, or absorption vessel therebetween.

In one aspect of this embodiment, the means for removing oxygen may comprise a second purge gas source connected to the primary reaction vessel which may be adapted to deliver a second purge gas to the primary reaction vessel and displace oxygen from said primary reaction vessel and may be further adapted to vent said oxygen and said second purge gas to atmosphere.

In another aspect, the means for removing oxygen may comprise a secondary reaction vessel holding a second bed of adsorbent, the vapor pump, a third conduit connecting the downstream end of the vapor pump to the secondary reaction vessel, and a secondary exhaust connected to the secondary reaction vessel for venting oxygen to atmosphere. The system may further include a recycle circuit, including a fourth conduit connecting the secondary reaction vessel to the upstream end of the vapor pump, and a recycle conduit connecting the downstream end of the vapor pump to the primary reaction vessel.

The system may further include a diffusion nozzle attached to the second conduit for diffusing volatile liquid vapor into the volatile liquid product in the storage tank.

DETAILED DESCRIPTION OF THE INVENTION

Figure 1:
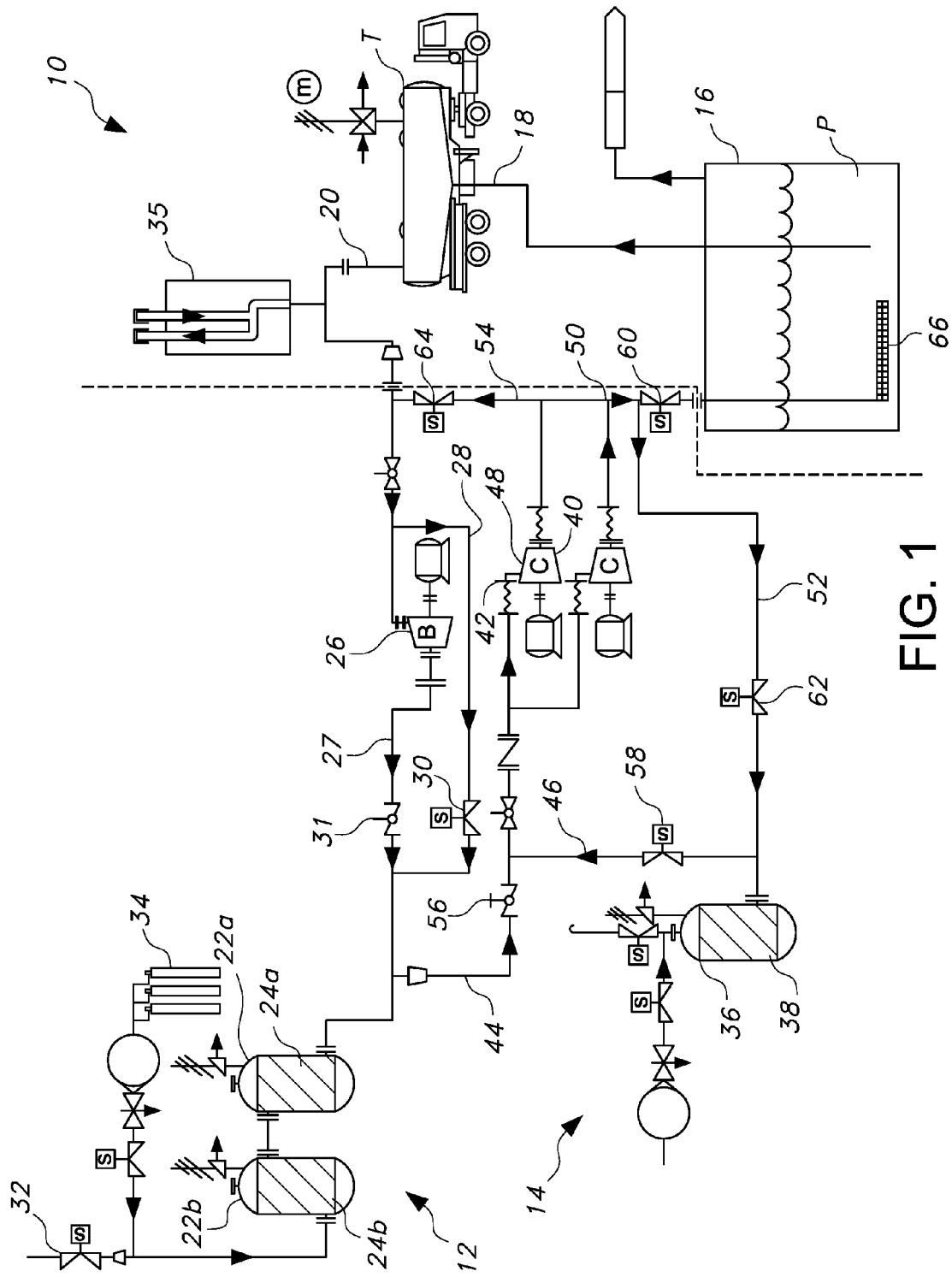
FIG. 1 is a block diagram of one embodiment of a vapor recovery system for reducing volatile liquid vapor emissions while simultaneously substantially eliminating oxygen ingestion.

A vapor recovery system 10 is provided for recovering volatile liquid vapor produced when loading a tank T of a tanker truck, a railcar or the like. The vapor recovery system 10 includes a product handling circuit 12 and a bed regeneration circuit 14.

The product handling circuit 12 may include (a) a storage tank 16, such as the underground storage tank illustrated in the drawing FIGS. 1-5, (b) a volatile liquid product outlet 18 that is connected to the tanker truck T, (c) a volatile liquid vapor inlet 20 that is also connected to the tanker truck and (d) a primary reaction vessel including a first bed of adsorbent. In the illustrated embodiment the primary reaction vessel comprises two vessels 22a,22b connected in series with each vessel including a bed of adsorbent 24a, 24b. While two vessels 22a, 22b are shown, it could be appreciated that substantially any number of vessels from 1-n may be provided as long as they have the necessary capacity to capture all volatile liquid vapors generated during loading of the tanker truck T.

As further illustrated in FIG. 1, the product handling circuit 12 may include a primary conduit 27, which may include a valve 31 for transporting volatile liquid vapor to the primary reaction vessels 22a,22b. Further the circuit 12 may include an optional first pump 26 for inducing flow through the primary conduit 27. The circuit 12 may include an optional bypass line 28 with a solenoid valve 30 for bypassing the first pump 26 if present. A vent 32 is connected to the primary reaction vessel 22 as is an optional source of purge gas 34, such as nitrogen. In addition, an atmospheric relief valve 35 is connected in the circuit 12 between the volatile liquid vapor inlet 20 and the primary reaction vessel 22a,22b (or first pump 26 if present).

The bed regeneration circuit 14 may include a secondary reaction vessel 36 having a second bed of adsorbent 38. The bed regeneration circuit 14 may also include a vapor pump 40 wherein an upstream end 42 may be connected by a first conduit 44 to the primary reaction vessel 22 and by a second conduit 46 to the secondary reaction vessel 36. In addition, a downstream end 48 of the vapor pump 40 is connected by a third conduit 50 to the storage tank 16 and by a fourth conduit 52 to the secondary reaction vessel 36. Further, the bed regeneration circuit 14 includes a recycle conduit 54 that connects the downstream end or minimum 48 of the vapor pump 40 to the product handling circuit 12 between the inlet 20 and the primary reaction vessel 22/optional first pump 26.

The bed regeneration circuit 14 may also include a first flow control valve 56 in the first conduit 44, a second flow control valve 58 in the second conduit 46, a third flow control valve 60 in the third conduit 50, a fourth flow control valve 62 in the fourth conduit 52 and a fifth flow control valve 64 in the recycle conduit 54. Further an optional diffusion nozzle 66 may be provided on the end of the third conduit 50 for delivering volatile liquid vapors into the volatile liquid product P held in the storage tank 16.

Figure 2:
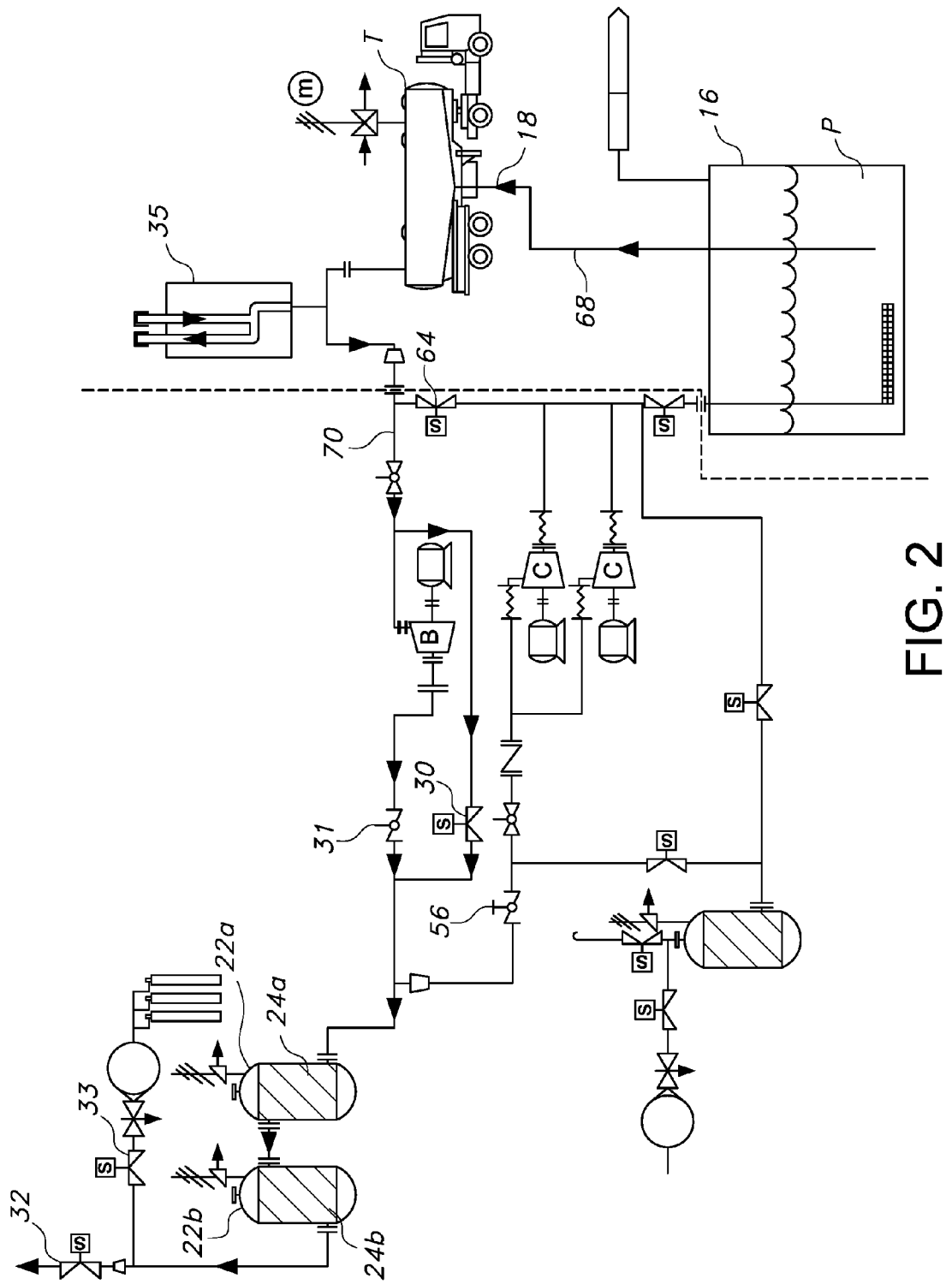
FIG. 2 is a block diagram similar to FIG. 1 but illustrating Phase 1 operation of the system.

With reference to FIG. 2, during a Phase 1 of operation, volatile liquid product P is delivered from the storage tank 16 to the tanker truck T. This is done by connecting the volatile liquid product outlet 18 on the delivery line 68 and the volatile liquid vapor inlet 20 to the tanker truck T. Volatile liquid product P is delivered to the tanker truck T through the delivery line 68 and outlet 18 by gravity feed, a dedicated pump (not shown) in the delivery line 68 or a pump (not shown) on the tanker truck T. As the volatile liquid product P is delivered to the tanker truck T, volatile liquid vapor is produced. During Phase 1, valves 33, 56 and 64 are closed, while valves 30, 31, and 32 are opened. This volatile liquid vapor passes through the inlet 20 and travels along the conduit 70 to primary reaction vessels 22a,22b. The optional pump 26 may be operated to ensure flow of vapor to the reaction vessels 22a,22b where the volatile liquid vapor is captured on the beds of adsorbent 24a,24b and air/oxygen is returned to atmosphere through the vent 32. The atmospheric relief valve 35 ensures that the vapor pressure within the product handling circuit 12 never exceeds a safe operating maximum or minimum value. Phase 1 may be referred to as utilizing the product handling circuit of the present invention.

Figure 3:
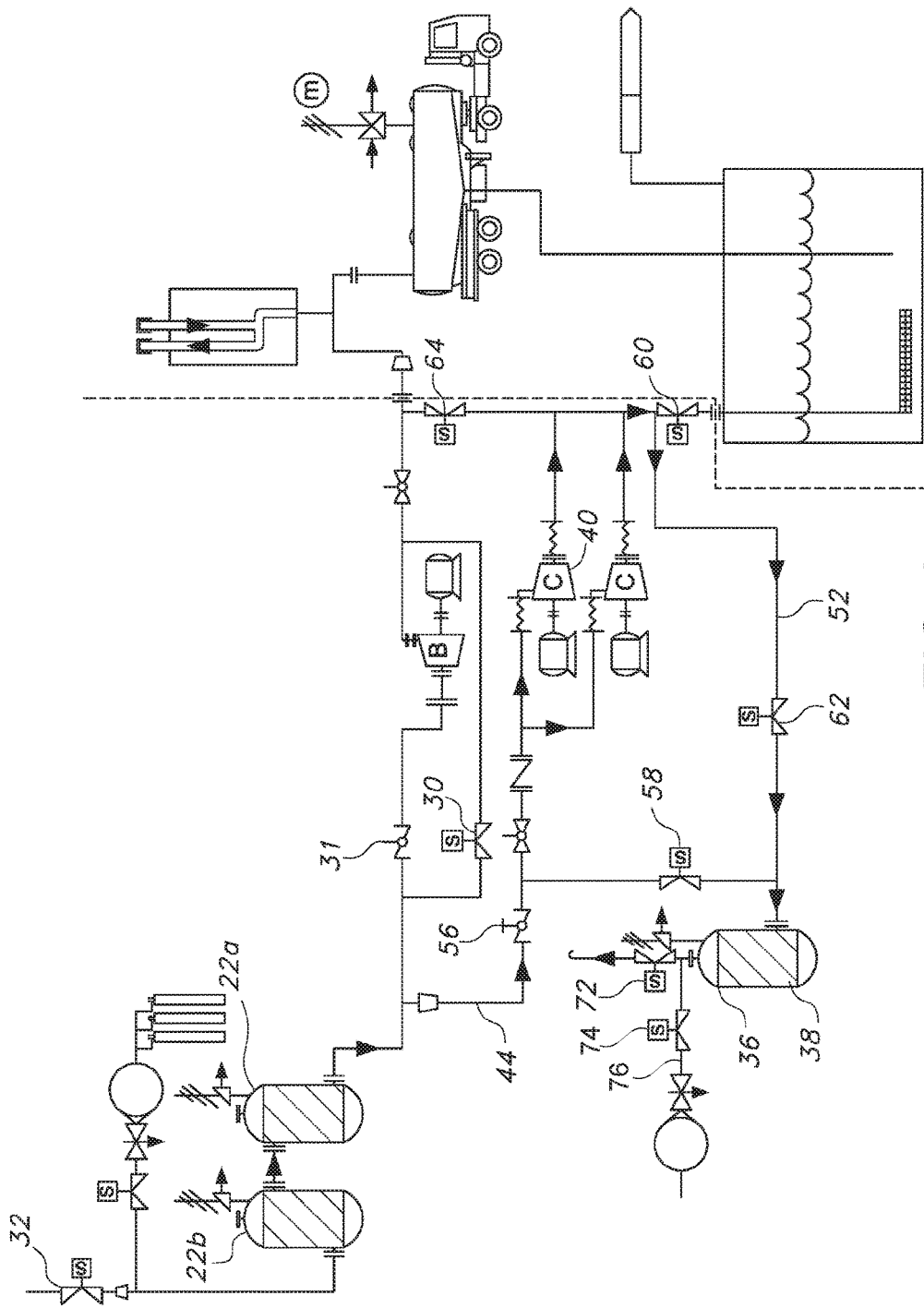
FIG. 3 is a block diagram similar to FIG. 1 but illustrating Phase 2 operation of the system.

Phase 2 of the operation is an optional phase that may be initiated after the tanker truck T has been loaded with volatile liquid product P. Phase 2 of the operation is illustrated in FIG. 3. During Phase 2 of operation, valves 30, 31, 32, 58, 60, and 64 are closed and valves 56 and 62 are opened. Pump 40 is then activated and a light vacuum is drawn on the primary reaction vessels 22a,22b so that oxygen in those reaction vessels and the first of the volatile liquid vapors are displaced and moved from the reaction vessels 22a,22b through the first conduit 44 to the upstream end 42 of the pump 40. The oxygen and vapors are then driven by the pump 40 through the downstream end 48 and the fourth conduit 52 and fourth flow control valve 62 to the secondary reaction vessel 36 wherein volatile liquid vapors are adsorbed by the second bed of adsorbent 38 while oxygen is exhausted into the atmosphere through the vent 72. In one embodiment, as illustrated in FIG. 3, a second vapor pump 41 may be provided in parallel with the first vapor pump 40, for aiding in drawing vapors from the primary reaction vessels 22a, 22b. Once a majority of the oxygen has been removed from the primary reaction vessels 22a, 22b, the third phase may be initiated. Phase 2 may be referred to as utilizing the oxygen removal circuit.

Figure 4A:
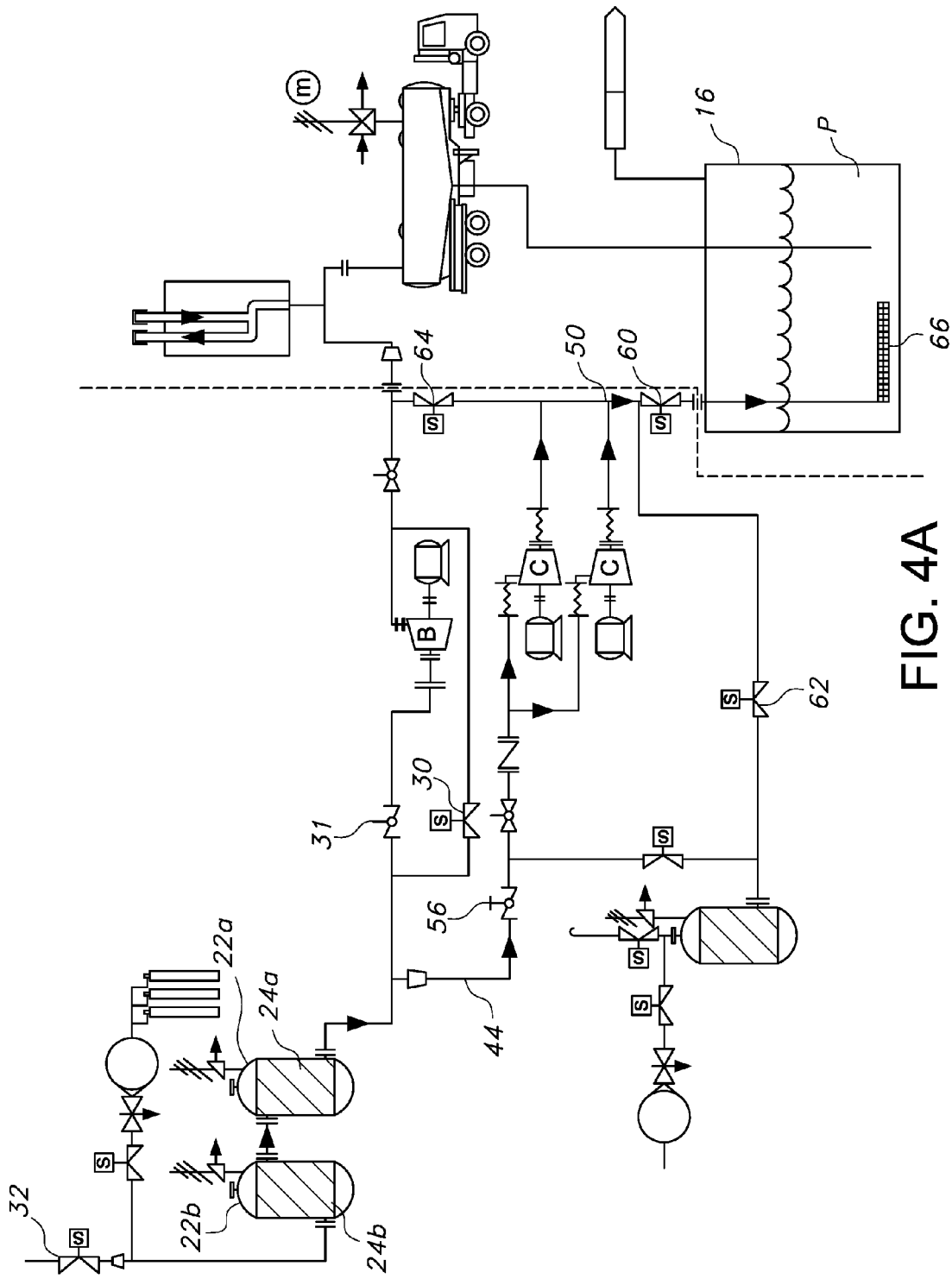
FIGS. 4A and 4B are block diagrams similar to FIG. 1 but illustrating Phase 3 operation of the system.
Figure 4B:
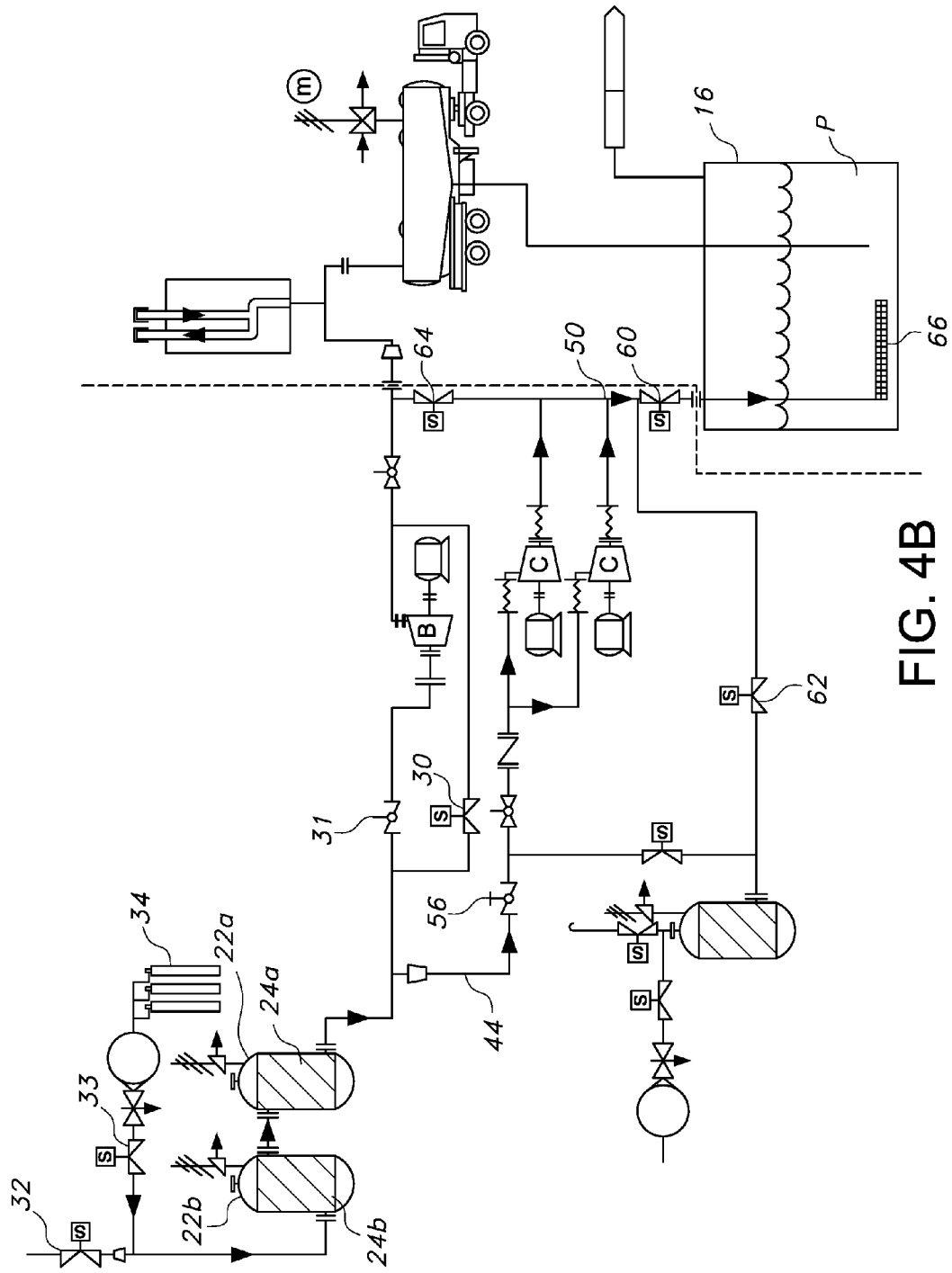

The Phase 3 is a two-part phase, as is illustrated in FIGS. 4A and 4B. In the event that the optional Phase 2 is utilized, the third phase may be initiated by closing vent 72 and the fourth flow control valve 62 and by opening the third control valve 60 (the fifth flow control valve 64 remains closed). In the case of a user proceeding directly from Phase 1 to Phase 3, valves 30, 31, 32, and 58 may be closed, and valves 56 and 60 may be opened. During part one of the third phase of operation, a deeper vacuum is drawn on the primary reaction vessels 22a,22b to regenerate the beds 24a,24b of adsorbent. More specifically, the pump 40 generates a vacuum that removes the previously captured volatile liquid vapors from the beds 24a,24b of adsorbent in the primary reaction vessels 22a,22b which travel through the first conduit 44 and first flow control valve 56 to the upstream end 42 of the pump 40 and then travel through the pump 40 and the downstream end 48 of that pump through the third conduit 50 and third flow control valve 60 to the storage tank 16. In the illustrated embodiment, the conduit 50 includes a diffusion nozzle 66 on the end thereof that is provided in the storage tank 16 below the upper level of the volatile liquid product P so that the volatile liquid vapors are diffused into the product in the storage tank where they are condensed.

During part two of Phase 3, as illustrated in FIG. 4B, valve 33 may be opened and a purge gas may be drawn through the beds of adsorbent 24a, 24b in the primary reaction vessels 22a, 22b to purge the beds of volatile liquid vapors at the end of the third phase. This purge gas may include any gas suitable for a given condition, such as air, nitrogen, or methane (such as in the case of a petroleum based product). In this embodiment those volatile liquid vapors are delivered directly from the primary reaction vessels 22a, 22 b to the storage tank 16 with the purge gas. Significantly, it should be appreciated that oxygen originally present in the primary reaction vessels 22a, 22b may be vented to the atmosphere through the second reaction vessel 36 during the second phase and, as such, the majority of the oxygen is not returned to the storage tank 16 with the volatile liquid vapor. Thus, the presence of oxygen is minimized or substantially eliminated upstream of the tanker truck T from the storage tank 16. Phase 3 may be referred to as utilizing the product recovery circuit of the present invention.

Figure 5:
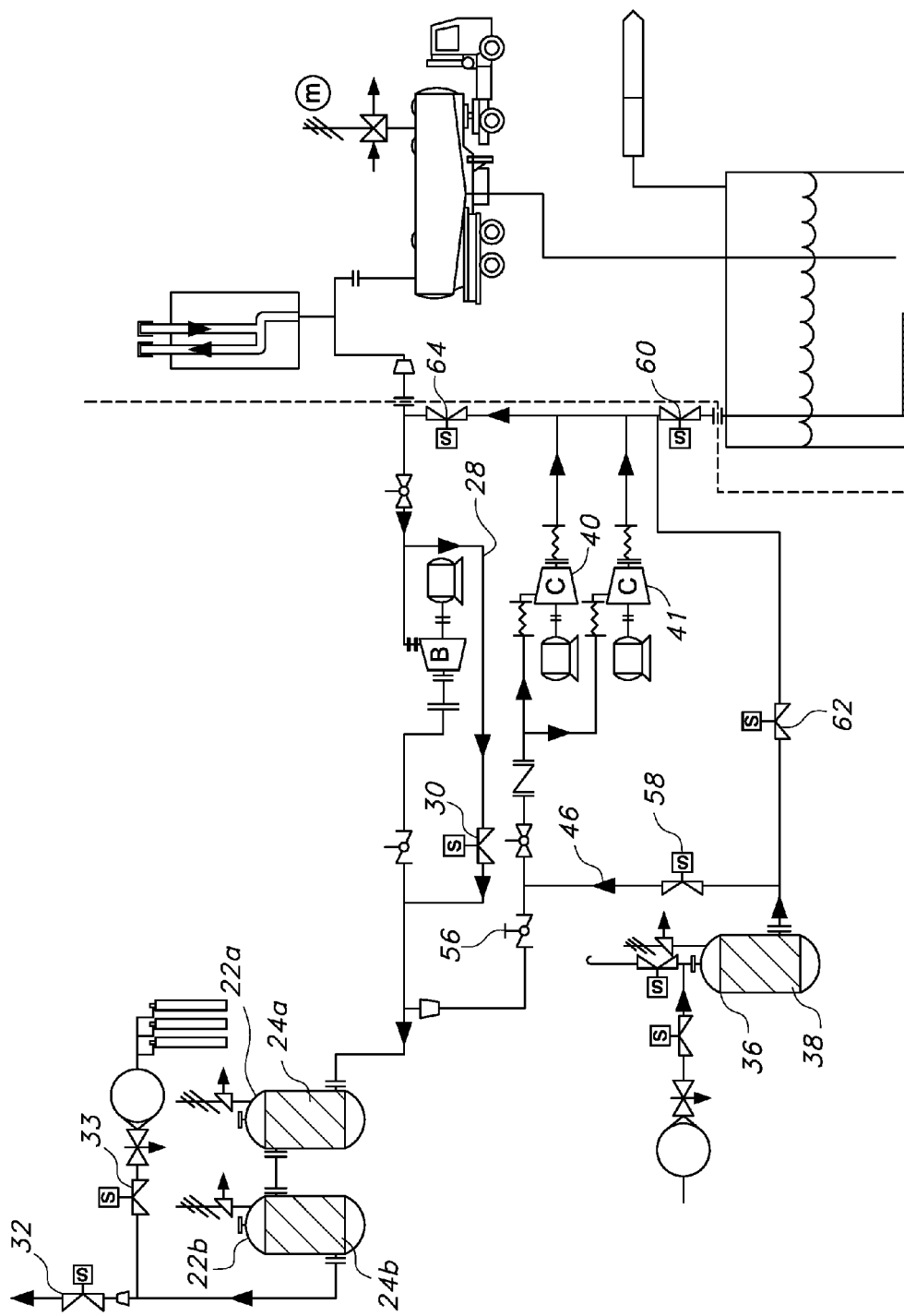
FIG. 5 is a block diagram similar to FIG. 1 but illustrating Phase 4 operation of the system.

After the beds of adsorbent 24a,24b in the primary reaction vessels 22a,22b have been completely regenerated, Phase 4 of the operation may be initiated, as is illustrated in FIG. 5. It should be noted that Phase 4 is also an optional phase, and generally may only be necessary in the event that optional Phase 2 is utilized. During phase 4 valves 33, 56, 60 and 62 are closed and valves 32, 58, 64, and 74 are opened. The vapor pump 40 (and optionally the second vapor pump 41) then draws purge air through purge conduit 76, through the secondary reaction vessel 36 and second bed of adsorbent 38, the second conduit 46 and the second flow control valve 58 to the upstream end 42 of the pump 40. This desorbs the volatile liquid vapors absorbed on the second bed of adsorbent 38 which then pass through the pump 40 past the downstream end 48 and then along the recycle conduit 54 and the bypass line 28 back to the primary reaction vessels 22a,22b. There, volatile liquid vapors are absorbed onto the beds of adsorbent 24a,24b while the oxygen and other gases present in the purge air are then vented to the atmosphere through the vent 32. This completes the regeneration of the second bed 38 of adsorbent. As a result, the entire operating cycle has been completed and the system 10 is now ready for Phase 1 operation and the capture of volatile liquid vapors from loading the next tanker truck T. Phase 4 may be referred to as utilizing a recycle circuit of the present invention.

In one aspect, Phase 3 may be considered a bed regeneration circuit. In another aspect, Phase 2, Phase 3, and Phase 4 may jointly be referred to as utilizing the bed regeneration circuit of the present invention.

Figure 6:
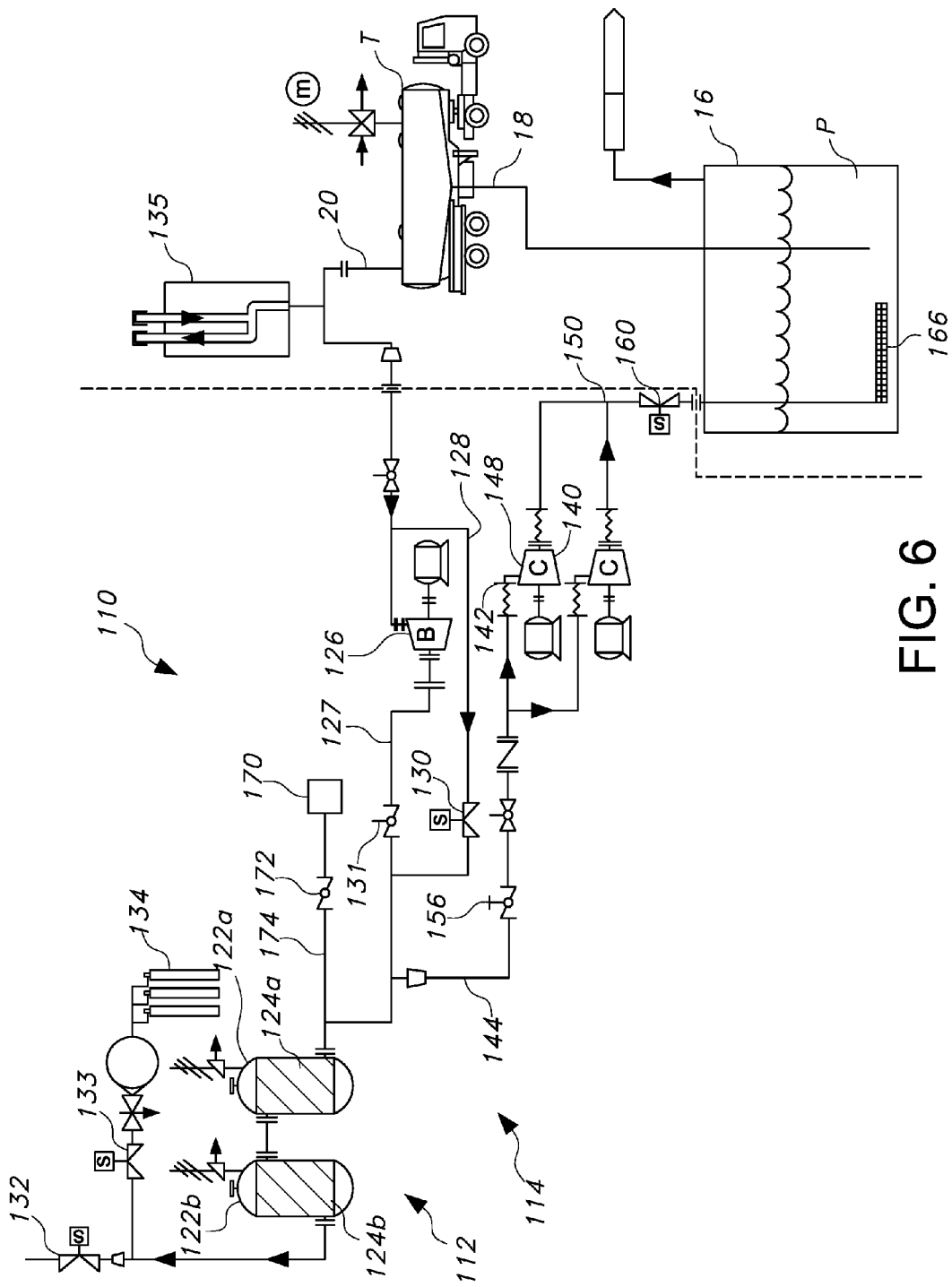
FIG. 6 is a block diagram of another embodiment of a vapor recovery system of the present invention.

In a further embodiment, as illustrated in FIG. 6, a vapor recovery system 110 is provided for recovering volatile liquid vapor produced when loading a tank T of a tanker truck, a railcar or the like. The vapor recovery system 110 includes a product handling circuit 112 and a bed regeneration circuit 114.

The product handling circuit 112 may be adapted to receive volatile liquid vapor produced when volatile liquid product P from a storage tank 16 is loaded via a volatile liquid product outlet 18 that is connected to the tanker truck T. A volatile liquid vapor inlet 20 that is connected to the tanker truck may be adapted to deliver the volatile liquid vapor to the product handling circuit 112, which may include a reaction vessel including a first bed of adsorbent 124. In the illustrated embodiment the reaction vessel comprises two vessels 122a,122b connected in series with each vessel including a bed of adsorbent 124a,124b. While two vessels 122a,122b are shown, it could be appreciated that substantially any number of vessels from 1 -n may be provided as long as they have the necessary capacity to capture all volatile liquid vapors generated during loading of the tanker truck T.

As further illustrated in FIG. 6, the product handling circuit 112 may include an optional first pump 126. The first pump may be connected to a primary conduit 127 with a valve 131 for regulating flow therethrough. Further the circuit 112 may include a bypass line 128 with a solenoid valve 130 for bypassing the first pump 126 if present. A vent 132 is connected to the reaction vessels 122a,122b as is a first purge source 134 as a first source of purge gas. The first purge source 134 may supply any gas suitable for a given condition, such as air, nitrogen, or methane (such as may be used in the case of the volatile liquid being a petroleum product). In the case of the first purge source 134 supplying air, the first purge source may simply be a vent open to atmosphere. An atmospheric relief valve 135 may be connected to the circuit 112 between the volatile liquid vapor inlet 20 and the reaction vessel 122a,122b (or first pump 126 if present).

The bed regeneration circuit 114 may include a vapor pump 140 connecting the reaction vessel 122a,122b,via a first conduit 144 directly to the storage tank 16 via a second conduit 150. The first conduit 144 may include a first valve 156, and the second conduit 150 may include a second valve 160. Further an optional diffusion nozzle 166 may be provided on the end of the second conduit 150 for delivering volatile liquid vapors into the volatile liquid product P held in the storage tank 16.

The bed regeneration circuit 114 may also include a second purge source 170, which may supply a purge gas, such as nitrogen or methane (such as may be used in the case of the volatile liquid being a petroleum product). The second purge source 170 may be connected to an inlet of the reaction vessel 122a,122b via a purge conduit 174. A purge valve 172 may be provided in conjunction with the purge conduit 174 to regulate flow therethrough.

Figure 7:
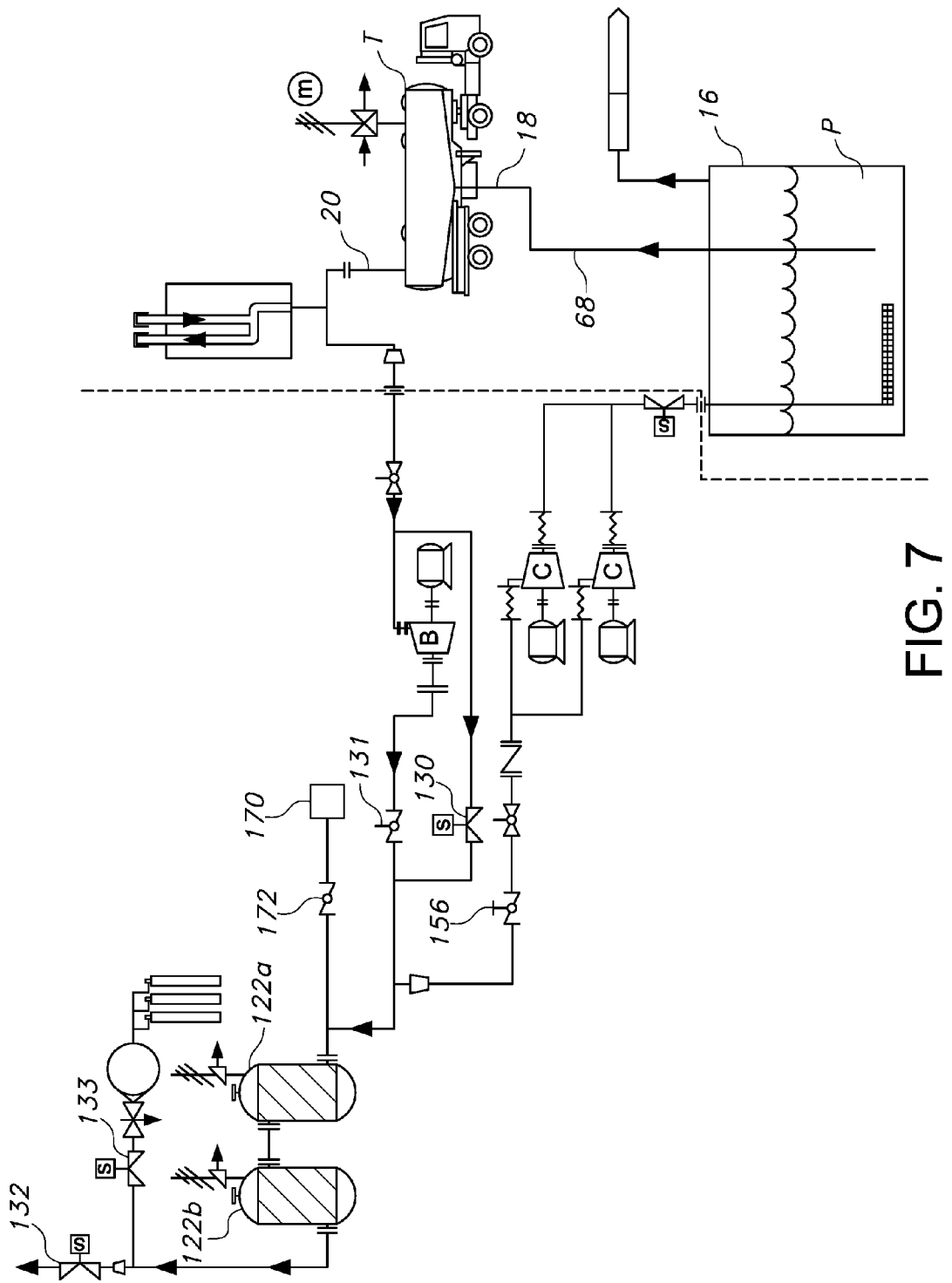
FIG. 7 is a block diagram similar to FIG. 6 but illustrating a product handling phase of operation of the system.

With reference to FIG. 7, during a product handling phase of operation, volatile liquid product P is delivered from the storage tank 16 to the tanker truck T. This is done by connecting the volatile liquid product outlet 18 on the delivery line 68 and the volatile liquid vapor inlet 20 to the tanker truck T. Volatile liquid product P is delivered to the tanker truck T through the delivery line 68 and outlet 18 by gravity feed, a dedicated pump (not shown) in the delivery line 68 or a pump (not shown) on the tanker truck T. As the volatile liquid product P is delivered to the tanker truck T, volatile liquid vapor is produced. During the product handling phase, valve 133, 156, and 172 are closed, while valves 130, 131, and 132 are opened. This volatile liquid vapor passes through the inlet 20 and travels along the conduits 127, 128 to primary reaction vessels 122a,122b. The optional pump 126 may be operated to ensure flow of vapor to the reaction vessels 122a,122b where the volatile liquid vapor is captured on the beds of adsorbent 124a,124b and air/oxygen is returned to atmosphere through the vent 132. The atmospheric relief valve 135 ensures that the vapor pressure within the product handling circuit 112 never exceeds a safe operating maximum or minimum value.

Figure 8A:
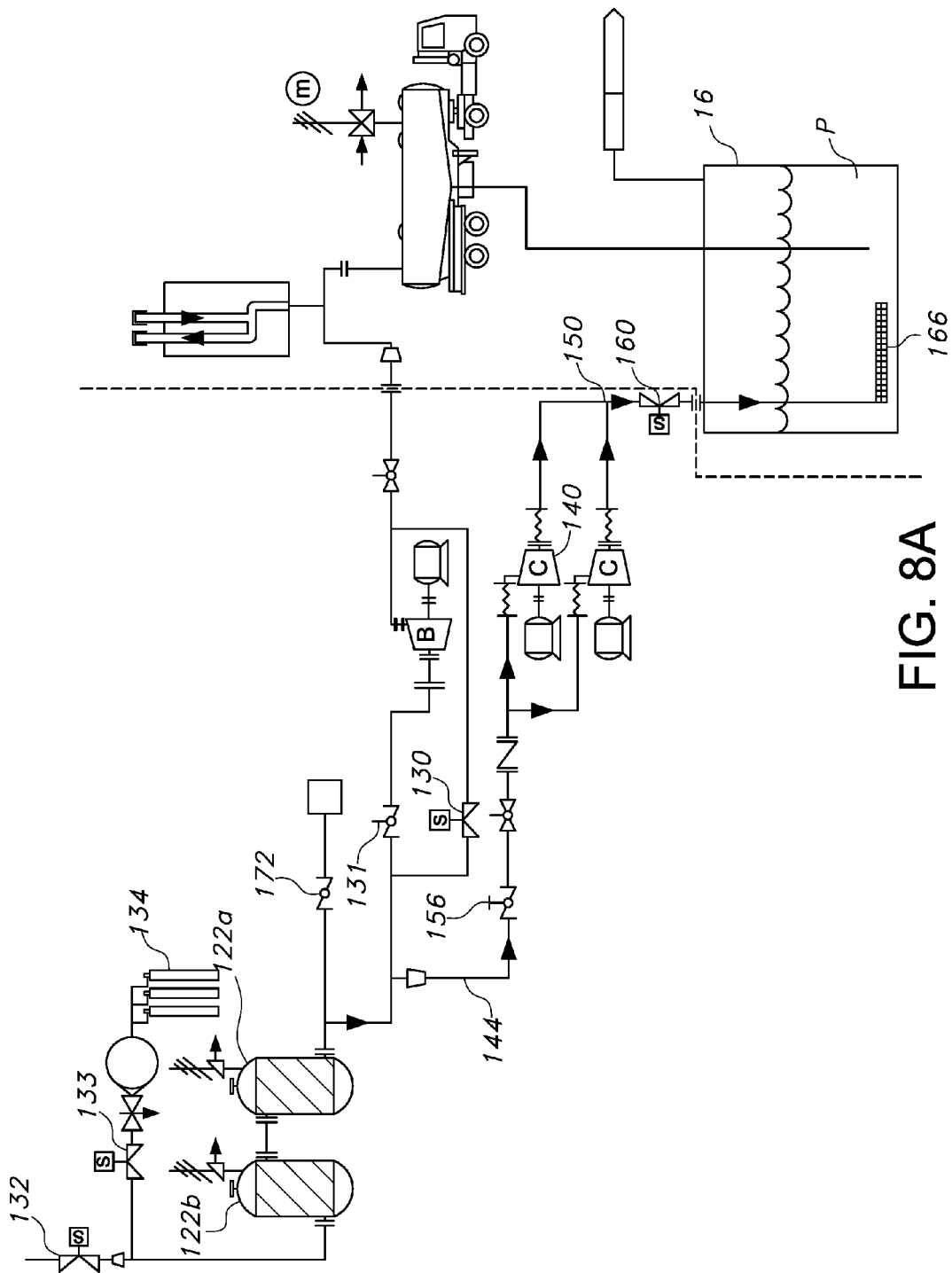
FIGS. 8A and 8B are block diagrams similar to FIG. 6 but illustrating a product recovery phase of operation of the system.
Figure 8B:
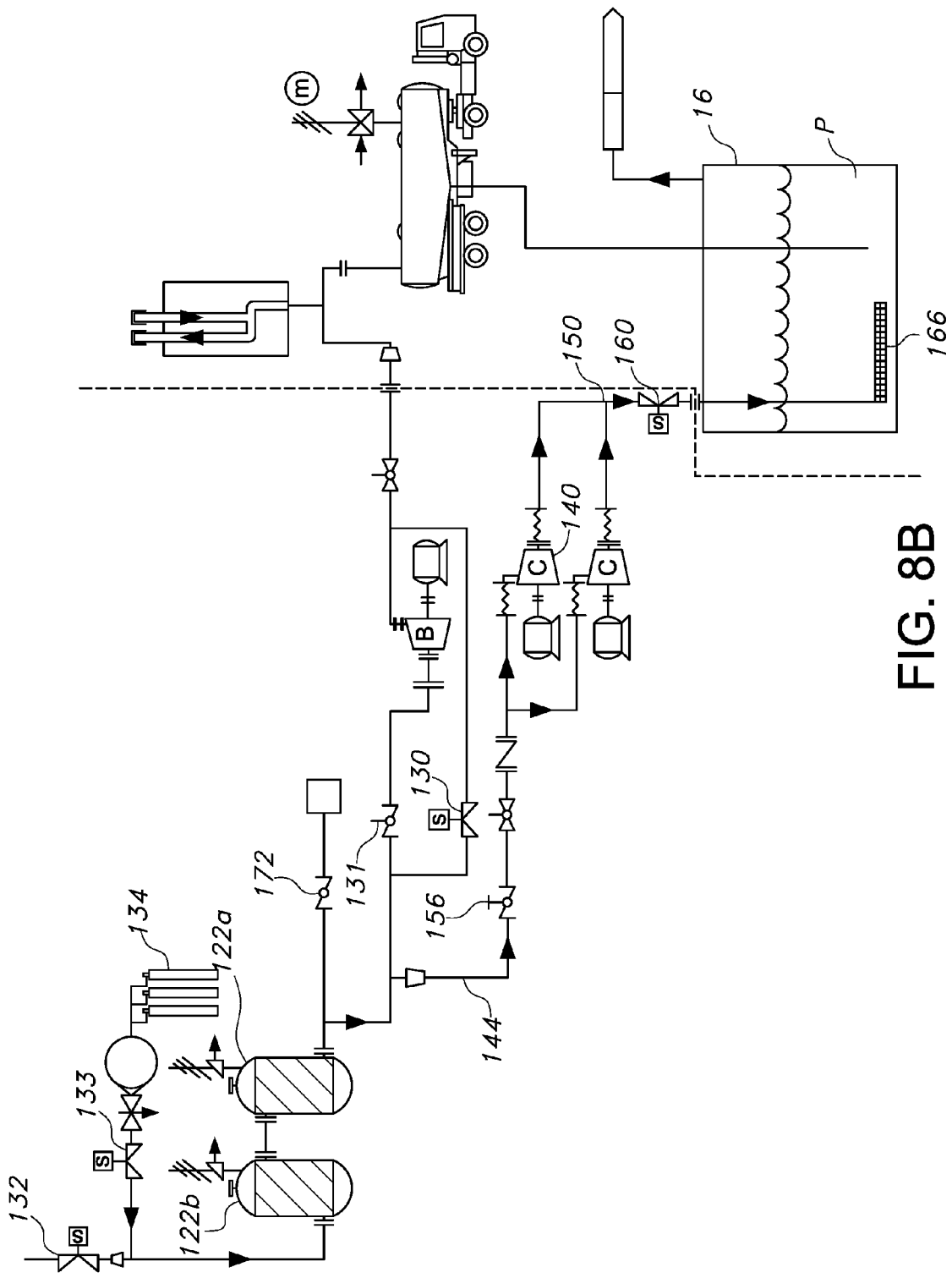

After the tanker truck T has been loaded with volatile liquid product, or after the bed of adsorbent has been at least partially saturated with adsorbed volatile liquid vapor, a product recovery phase may be initiated, as is illustrated in FIGS. 8A and 8B. During the initial portion of the product recovery phase, as shown in FIG. 8A, the adsorbed volatile liquid vapor may be removed from the reaction vessels 122a,122b and delivered directly to the storage tank 16. This portion of the product recovery phase requires that valves 156 and 160 be opened, while valves 130, 131, 132, 133 and 172 are closed.

During this phase, the vapor pump 140 may draw a vacuum on the reaction vessels 122a, 122b to regenerate the beds 124a,124b of adsorbent. More specifically, the vacuum created by the vapor pump 140 removes the previously captured volatile liquid vapors from the beds of adsorbent 124a,124b. A second vapor pump may be provided in parallel with the first vapor pump 140, for aiding in drawing vapors from the primary reaction vessels 122a,122b.

The recovered vapors may travel through the first conduit 144 and the first valve 156, through the vapor pump 140, and through the second conduit 150 and second valve 160 to the storage tank 16. Accordingly, the reaction vessels 122a,122b and the storage tank are directly connected to one another, as there is no separation, adsorption, or absorption element therebetween. The recovered product may be vented into the storage tank 16 above the product P, or may be released below the level of the product P, so as to be diffused and condensed therein. In one embodiment, diffusion nozzle 166 may aid in the diffusion of the recovered volatile liquid vapor within the product.

As is illustrated in FIG. 8B, valve 133 may be opened to complete the product recovery phase. This allows purge gas to flow from the first purge source 134, through the reaction vessels 122a,122b. Vapor pump 140 may draw the purge gas and remaining recovered volatile liquid vapor from the reaction vessels 122a,122b, and deliver said purge gas and vapors directly to the storage tank 16. This purge gas and vapor combination may follow the same path as the vapors in the first portion of the product recovery phase, such as via first conduit 144 and second conduit 150, to the storage tank 16.

Figure 9:
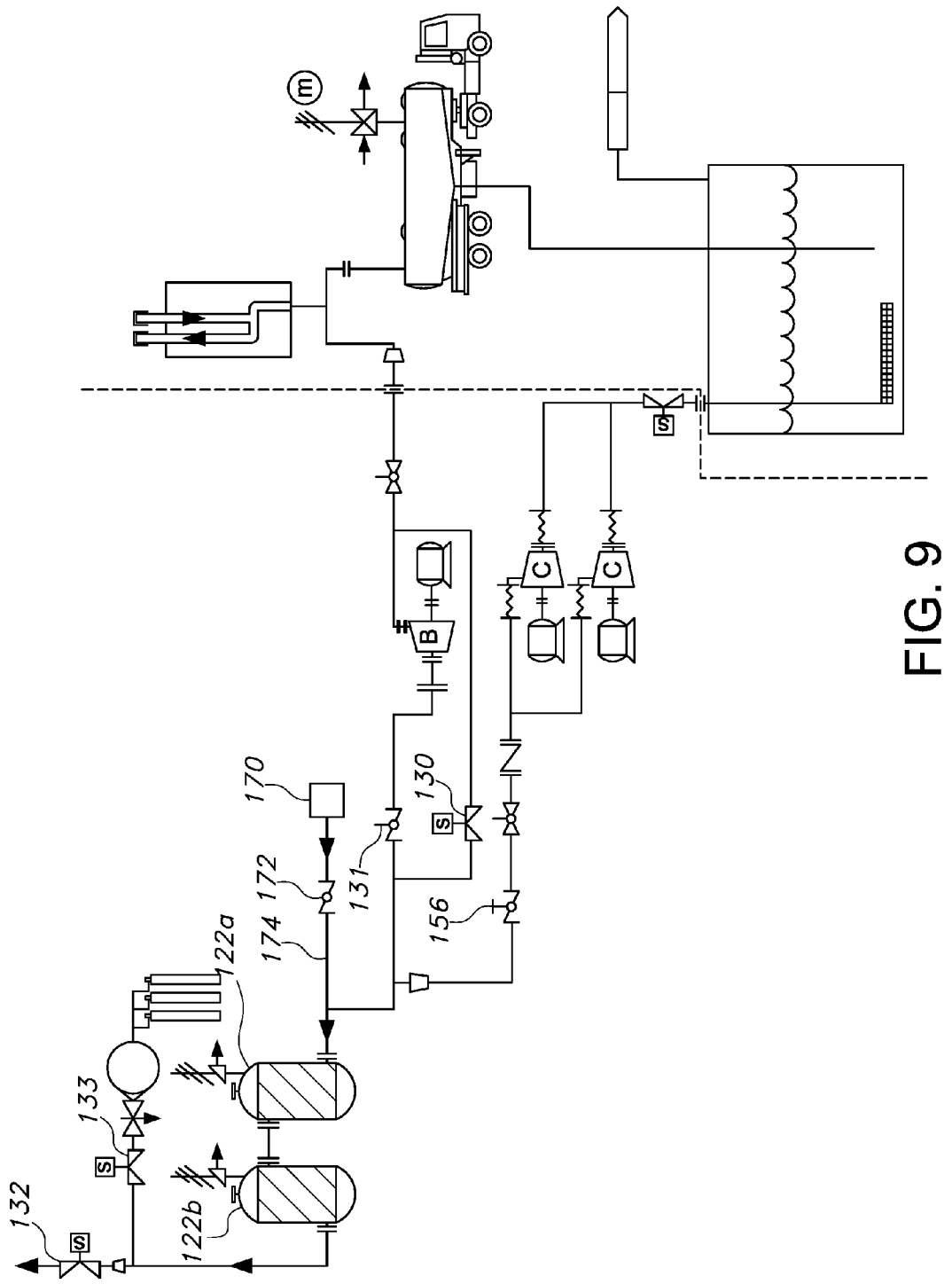
FIG. 9 is a block diagram similar to FIG. 6 but illustrating an oxygen removal phase of operation of the system.

In some instances, it may be desirable to remove oxygen or any other gases in the reaction vessels 122a,122b, such as prior to the product recovery phase. This may be advantageous in the case of the presence of oxygen or other gas being detrimental to the product in the storage tank. Accordingly, an optional oxygen removal phase may be implemented, as is illustrated in FIG. 9. During the oxygen removal phase, valves 132 and 172 may be opened, and valves 130, 131, and 133 may be closed. This allows a second purge gas from the second purge source 170 to flow through the purge conduit 174, through the reaction vessels 122a,122b, and vent through valve 132, so as to exit the system, such as in the case of venting to atmosphere. In one aspect, the second purge gas may be an inert gas such as nitrogen, or any other gas with little or no effect on the product P in the storage tank 16. For instance, the second purge gas may be methane in the case of the product P comprising a petroleum product.

The oxygen removal phase allows the second purge gas to force oxygen (and/or any other undesirable gas) out of the reaction vessels 122a,122b, leaving the oxygen or other undesirable gas removed or substantially removed from the system. Accordingly, during the subsequent product recovery phase, the storage tank is contaminated with little to no oxygen or other undesirable gas.

The foregoing has been presented for purposes of illustration and description. It is not intended to be exhaustive or to limit the embodiments to the precise form disclosed. Obvious modifications and variations are possible in light of the above teachings. For example, while the illustrated embodiment includes a diffusion nozzle 66 on the end of the conduit 50 in the storage tank 16 beneath the surface of the liquid product P, such a diffusion nozzle is not required. Volatile liquid vapors may be simply returned to the storage tank 16 and released in the head space above the surface of the liquid product P if desired. All such modifications and variations are within the scope of the appended claims when interpreted in accordance with the breadth to which they are fairly, legally and equitably entitled.

What is claimed:

1. A vapor recovery system for recovering volatile liquid vapor from a combination of volatile liquid vapor and oxygen collected when loading a loading vessel with volatile liquid product from a storage tank, comprising:
    a product handling circuit including a primary reaction vessel having an inlet side and an outlet side, said primary reaction vessel holding a first bed of adsorbent adapted to adsorb the volatile liquid vapor, a primary conduit connected to the inlet side for transporting volatile liquid vapor and oxygen from the loading vessel to the primary reaction vessel, and an exhaust connected to the outlet side for venting oxygen to atmosphere; and
    a bed regeneration circuit adapted to remove volatile liquid vapor from the first bed of adsorbent, said bed regeneration circuit including a vapor pump wherein an upstream end of said vapor pump is directly connected by a first conduit to the inlet side of said primary reaction vessel and wherein a downstream end of said vapor pump is directly connected by a second conduit to said storage tank, said bed regeneration circuit further including (a) a secondary reaction vessel holding a second bed of adsorbent, said secondary reaction vessel adapted to receive vapor and oxygen from the primary reaction vessel, (b) a third conduit connecting a downstream end of the vapor pump to the secondary reaction vessel, and (c) a fourth conduit connecting the secondary reaction vessel to an upstream end of the vapor pump.

2. The system of claim 1, further including a primary flow control valve in said primary conduit and a first flow control valve in the first conduit, said primary and first flow control valves adapted to isolate said product handling circuit from said regeneration circuit.

3. The system of claim 2, wherein the primary valve in an open condition and the first valve in a closed condition allows volatile liquid vapor to flow from the loading vessel to the primary reaction vessel for collection on said first bed of adsorbent, and wherein the primary valve in a closed condition and the first valve in an open condition allows volatile liquid vapor to flow directly from the primary reaction vessel to the storage tank.

4. The system of claim 2, wherein the bed regeneration circuit includes a first purge gas source connected to the outlet side of the primary reaction vessel, and wherein the bed regeneration circuit is adapted to transport a first purge gas from said first purge gas source through the primary reaction vessel, through the first conduit and the second conduit, and into the storage tank.

5. The system of claim 4, wherein the bed regeneration circuit further includes a second purge gas source connected to the inlet side of the primary reaction vessel, and wherein the bed regeneration circuit is adapted to transport a second purge gas from the second purge gas source through the primary reaction vessel and out the exhaust to atmosphere.

6. The system of claim 1, wherein the third conduit includes a third valve for controlling flow from the vapor pump to the secondary reaction vessel, and wherein the fourth conduit includes a fourth valve for controlling flow from the secondary reaction vessel to the vapor pump.

7. The system of claim 1, further including:
    a recycle conduit connecting said regeneration circuit to said product handling circuit between the downstream end of the vapor pump and the primary conduit; and
    a fifth flow control valve in said recycle conduit for controlling flow from the bed regeneration circuit to the product handling circuit.

8. The system of claim 1, wherein the third and fourth conduits connect to an inlet side of the secondary reaction vessel, and further including a secondary exhaust connected to an outlet side of the secondary reaction vessel.

9. The system of claim 1, further including a diffusion nozzle connected to said second conduit for delivering volatile liquid vapors from the primary reaction vessel into the volatile liquid product held in said storage tank.

10. The system of claim 1, wherein said primary reaction vessel comprises multiple reaction vessels connected in series.

11. A method of recovering volatile liquid vapors and removing oxygen resulting from loading volatile liquid product into a loading vessel from a storage tank, said method comprising:
    collecting the volatile liquid vapors on a first bed of adsorbent in a primary reaction vessel and exhausting oxygen from said primary reaction vessel;
    regenerating said first bed of adsorbent by removing volatile liquid vapors from said first bed of adsorbent and directly delivering said volatile liquid vapors to the storage tank; and
    displacing volatile liquid vapors and oxygen from said primary reaction vessel and collecting said volatile liquid vapors on a second bed of adsorbent in a secondary reaction vessel while venting said oxygen to atmosphere.

12. The method of claim 11, further including regenerating said second bed of adsorbent by removing volatile liquid vapors from said second bed of adsorbent and collecting said volatile liquid vapors on said first bed of adsorbent in said primary reaction vessel.

13. A vapor recovery system for recovering volatile liquid vapor from a composition including volatile liquid vapor and oxygen produced when loading a loading vessel from a storage tank of volatile liquid product, said system comprising:
(a) a product handling circuit including
  a primary reaction vessel holding a first bed of adsorbent adapted to adsorb the volatile liquid vapor,
  a primary conduit for transporting the composition from the loading vessel to the primary reaction vessel, and
  a primary exhaust for venting oxygen to atmosphere;
(b) means for removing oxygen from the primary reaction vessel wherein said means for removing oxygen includes a second purge gas source connected to the primary reaction vessel, and is adapted to deliver a second purge gas to the primary reaction vessel and displace oxygen from said primary reaction vessel and is further adapted to vent said oxygen and said second purge gas to atmosphere; and
(c) a product recovery circuit including
  a vapor pump with an upstream end and a downstream end,
  a first conduit connecting the primary reaction vessel to the upstream end of the vapor pump,
  a second conduit directly connecting the downstream end of the vapor pump to the storage tank, and
  a first purge gas source, wherein the product recovery circuit is adapted to deliver a first purge gas from the first purge gas source through the primary reaction vessel, the first conduit, and the second conduit to the storage tank;
  wherein the product recovery circuit connects the primary reaction vessel to the storage tank with no separation, adsorption, or absorption vessel therebetween.

14. The system of claim 13, further including a diffusion nozzle attached to the second conduit for diffusing volatile liquid vapor into the volatile liquid product in the storage tank.

15. A vapor recovery system for recovering volatile liquid vapor from a combination of volatile liquid vapor and oxygen collected when loading a loading vessel with volatile liquid product from a storage tank, comprising:
a product handling circuit including a primary reaction vessel having an inlet side and an outlet side, said primary reaction vessel holding a first bed of adsorbent adapted to adsorb the volatile liquid vapor, a primary conduit connected to the inlet side for transporting volatile liquid vapor and oxygen from the loading vessel to the primary reaction vessel, and an exhaust connected to the outlet side for venting oxygen to atmosphere; and
a bed regeneration circuit adapted to remove volatile liquid vapor from the first bed of adsorbent, said bed regeneration circuit including a vapor pump wherein an upstream end of said vapor pump is directly connected by a first conduit to the inlet side of said primary reaction vessel and wherein a downstream end of said vapor pump is directly connected by a second conduit to said storage tank;
wherein said vapor recovery system further includes a primary flow control valve in said primary conduit and a first flow control valve in the first conduit, said primary and first flow control valves adapted to isolate said product handling circuit from said regeneration circuit wherein
  (a) the primary flow control valve in an open condition and the first valve in a closed condition allows volatile liquid vapor to flow from the loading vessel to the primary reaction vessel for collection on said first bed of adsorbent, and wherein the primary valve in a closed condition and the first valve in an open condition allows volatile liquid vapor to flow directly from the primary reaction vessel to the storage tank,
  (b) the bed regeneration circuit includes a first purge gas source connected to the outlet side of the primary reaction vessel, and wherein the bed regeneration circuit is adapted to transport a first purge gas from said first purge gas source through the primary reaction vessel, through the first conduit and the second conduit, and into the storage tank and
  (c) the bed regeneration circuit further includes a second purge gas source connected to the inlet side of the primary reaction vessel, and wherein the bed regeneration circuit is adapted to transport a second purge gas from the second purge gas source through the primary reaction vessel and out the exhaust to atmosphere.

16. A method of recovering volatile liquid vapors and removing oxygen resulting from loading volatile liquid product into a loading vessel from a storage tank, said method comprising:
collecting the volatile liquid vapors on a first bed of adsorbent in a primary reaction vessel and exhausting oxygen from said primary reaction vessel;
regenerating said first bed of adsorbent by removing volatile liquid vapors from said first bed of adsorbent and directly delivering said volatile liquid vapors to the storage tank; and
displacing oxygen from the primary reaction vessel with a purge gas and venting said oxygen to atmosphere.

17. A vapor recovery system for recovering volatile liquid vapor from a composition including volatile liquid vapor and oxygen produced when loading a loading vessel from a storage tank of volatile liquid product, said system comprising:
(a) a product handling circuit including
  a primary reaction vessel holding a first bed of adsorbent adapted to adsorb the volatile liquid vapor,
  a primary conduit for transporting the composition from the loading vessel to the primary reaction vessel, and
  a primary exhaust for venting oxygen to atmosphere;
(b) means for removing oxygen from the primary reaction vessel wherein the means for removing oxygen includes a secondary reaction vessel holding a second bed of adsorbent, the vapor pump, a third conduit connecting the downstream end of the vapor pump to the secondary reaction vessel, and a secondary exhaust connected to the secondary reaction vessel for venting oxygen to atmosphere; and (c) a product recovery circuit including
a vapor pump with an upstream end and a downstream end,
a first conduit connecting the primary reaction vessel to the upstream end of the vapor pump,
a second conduit directly connecting the downstream end of the vapor pump to the storage tank, and
a first purge gas source, wherein the product recovery circuit is adapted to deliver a first purge gas from the first purge gas source through the primary reaction vessel, the first conduit, and the second conduit to the storage tank;
wherein the product recovery circuit connects the primary reaction vessel to the storage tank with no separation, adsorption, or absorption vessel therebetween.

18. The system of claim 17, further including a recycle circuit, including a fourth conduit connecting the secondary reaction vessel to the upstream end of the vapor pump, and a recycle conduit connecting the downstream end of the vapor pump to the primary reaction vessel.

\* \* \* \* \*